(12) United States Patent
Kaplan

(10) Patent No.: US 7,496,554 B2
(45) Date of Patent: Feb. 24, 2009

(54) METHOD AND SYSTEM FOR WIRELESS DATABASE MANAGEMENT

(75) Inventor: Ari D. Kaplan, Chicago, IL (US)

(73) Assignee: Stavros Investments LLC, Las Vegas, NV (US)

( * ) Notice: Subject to any disclaimer, the term of this patent is extended or adjusted under 35 U.S.C. 154(b) by 98 days.

(21) Appl. No.: 10/007,912

(22) Filed: Nov. 8, 2001

(65) Prior Publication Data

US 2002/0083044 A1    Jun. 27, 2002

Related U.S. Application Data

(60) Provisional application No. 60/247,523, filed on Nov. 9, 2000.

(51) Int. Cl.
*G06F 17/30* (2006.01)

(52) U.S. Cl. .................. 707/1; 707/3; 707/5; 707/102; 709/223; 709/224

(58) Field of Classification Search ............. 707/1, 707/3, 9–10, 109; 705/14; 709/217, 226–227, 709/235
See application file for complete search history.

(56) References Cited

U.S. PATENT DOCUMENTS

| | | | |
|---|---|---|---|
| 4,739,319 A | 4/1988 | Okuda et al. | |
| 5,615,268 A | 3/1997 | Bisbee et al. | |
| 5,696,701 A * | 12/1997 | Burgess et al. | 714/25 |
| 5,696,898 A | 12/1997 | Baker et al. | |
| 5,713,018 A | 1/1998 | Chan | |
| 5,812,131 A | 9/1998 | Bertram | |
| 5,881,232 A | 3/1999 | Cheng et al. | |
| 5,926,549 A | 7/1999 | Pinkas | |
| 5,963,965 A | 10/1999 | Vogel | |
| 6,005,561 A | 12/1999 | Hawkins et al. | |
| 6,023,762 A | 2/2000 | Dean et al. | |
| 6,073,168 A | 6/2000 | Mighdoll et al. | |
| 6,088,796 A | 7/2000 | Cianfrocca | |
| 6,097,336 A | 8/2000 | Stilp | |
| 6,098,092 A | 8/2000 | Padzensky | |
| 6,105,006 A * | 8/2000 | Davis et al. | 705/35 |
| 6,122,666 A | 9/2000 | Beurket et al. | |
| 6,128,655 A | 10/2000 | Fields et al. | |
| 6,141,755 A | 10/2000 | Dowd | |
| 6,170,017 B1 * | 1/2001 | Dias et al. | 709/235 |

(Continued)

OTHER PUBLICATIONS

PCT International Preliminary Examination Report prepared by the U.S. Patent & Trademark Office, mailed on Dec. 26, 2002.

(Continued)

*Primary Examiner*—Don Wong
*Assistant Examiner*—Hanh B Thai
(74) *Attorney, Agent, or Firm*—Sterne, Kessler, Goldstein & Fox P.L.L.C.

(57) ABSTRACT

An efficient method and system for wireless database management that allows database administrators to monitor and manage a plurality of databases from a remote location is disclosed. Included in this description are steps for reducing the amount of data transmitted and received by narrow bandwidth wireless communications, storing the results of requests made by the same user repeatedly for quicker access time, and enabling a single user to access multiple databases within the wireless database management system simultaneously.

25 Claims, 5 Drawing Sheets

U.S. PATENT DOCUMENTS

| | | | |
|---|---|---|---|
| 6,178,505 B1 | 1/2001 | Schneider et al. | |
| 6,182,083 B1 * | 1/2001 | Scheifler et al. | 707/103 R |
| 6,205,440 B1 | 3/2001 | Nusbickel | |
| 6,233,577 B1 * | 5/2001 | Ramasubramani et al. | 707/9 |
| 6,249,755 B1 | 6/2001 | Yemini et al. | |
| 6,253,326 B1 | 6/2001 | Lincke et al. | |
| 6,263,437 B1 * | 7/2001 | Liao et al. | 713/169 |
| 6,269,402 B1 * | 7/2001 | Lin et al. | 709/227 |
| 6,359,880 B1 * | 3/2002 | Curry et al. | 370/352 |
| 6,389,437 B2 | 5/2002 | Stoub | |
| 6,405,123 B1 | 6/2002 | Rennard et al. | |
| 6,415,138 B2 | 7/2002 | Sirola et al. | |
| 6,456,603 B1 * | 9/2002 | Ismailov et al. | 370/310 |
| 6,473,609 B1 | 10/2002 | Schwartz et al. | |
| 6,480,891 B1 * | 11/2002 | Chernyak et al. | 709/223 |
| 6,516,203 B1 | 2/2003 | Enzmann et al. | |
| 6,574,742 B1 * | 6/2003 | Jamroga et al. | 713/400 |
| 6,587,835 B1 * | 7/2003 | Treyz et al. | 705/14 |
| 6,591,306 B1 | 7/2003 | Redlich | |
| 6,636,873 B1 * | 10/2003 | Carini et al. | 707/201 |
| 6,636,898 B1 | 10/2003 | Ludovici et al. | |
| 6,642,945 B1 | 11/2003 | Sharpe | |
| 6,775,291 B1 * | 8/2004 | Ryu et al. | 370/401 |
| 6,895,234 B1 * | 5/2005 | Laursen et al. | 455/403 |
| 6,920,487 B2 | 7/2005 | Sofer et al. | |
| 6,941,137 B2 * | 9/2005 | Park | 455/423 |
| 7,035,828 B2 * | 4/2006 | Ketonen et al. | 705/51 |
| 7,287,072 B1 * | 10/2007 | Dispensa et al. | 709/224 |
| 2001/0049277 A1 * | 12/2001 | Meyer et al. | 455/414 |
| 2002/0031230 A1 | 3/2002 | Sweet et al. | |

OTHER PUBLICATIONS

PCT International Search Report prepared by the U.S. Receiving Office mailed on May 6, 2002.

PCT International Search Report prepared by the U.S. Receiving Office for Application No. PCT/US01/46824, mailed on Apr. 2, 2002.

PCT International Preliminary Examination Report prepared by the U.S. Patent & Trademark Office for Application No. PCT/US01/46824, mailed on Sep. 4, 2002.

PCT International Preliminary Examination Report mailed by the U.S. Receiving Office for Application No. PCT/US01/46752 on Nov. 19, 2002.

PCT International Search Report prepared by the U.S. Receiving Office for Application No. PCT/US01/46752, mailed on Apr. 19, 2002.

* cited by examiner

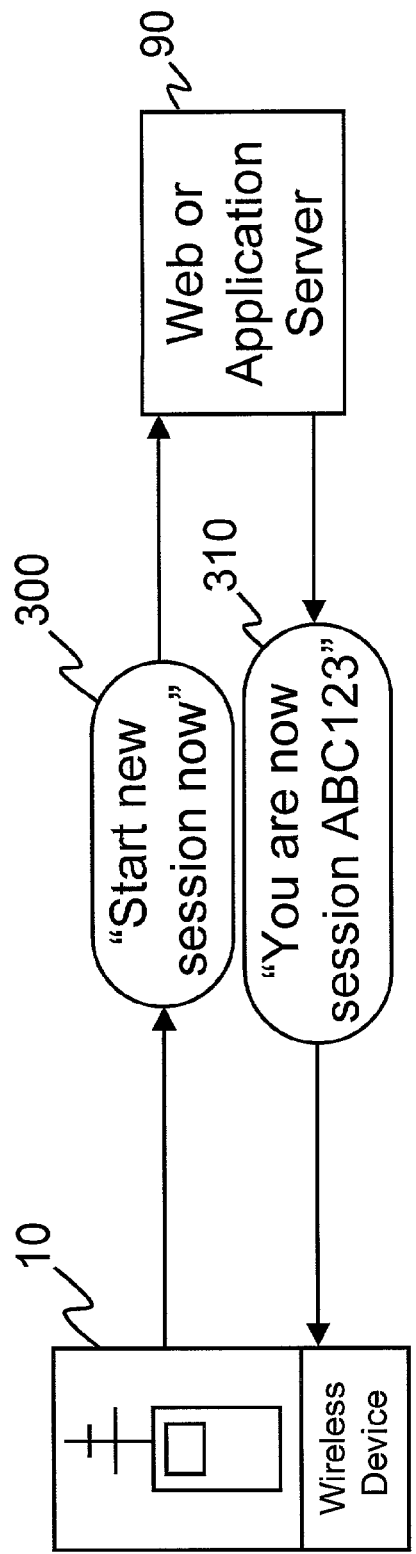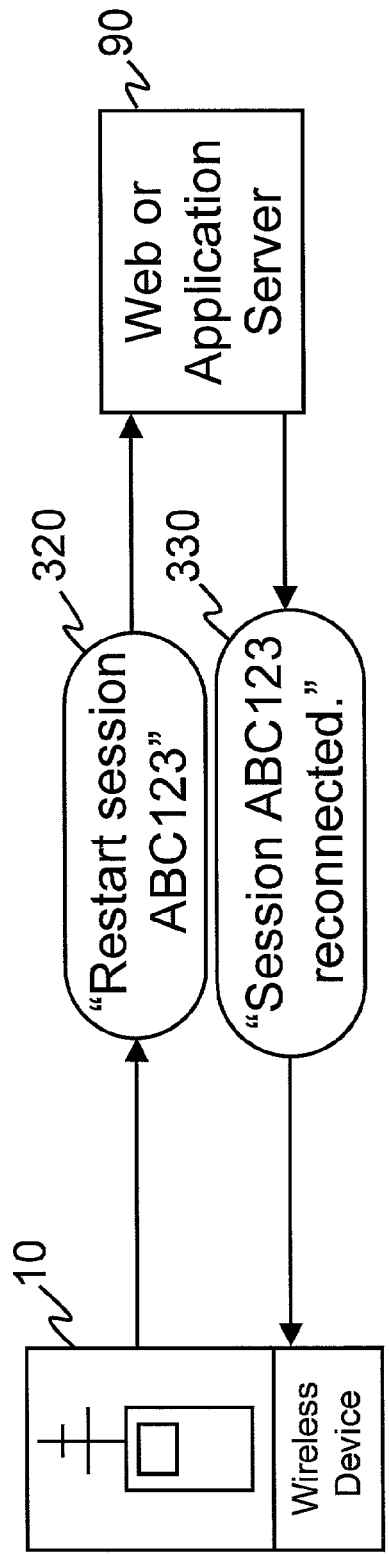

METHOD AND SYSTEM FOR WIRELESS DATABASE MANAGEMENT

CROSS-REFERENCE TO RELATED APPLICATIONS

This application claims the benefit of U.S. Provisional Patent Application Ser. No. 60/247,523, filed on Nov. 9, 2000.

FIELD OF THE INVENTION

The present invention generally relates to an improved method and system for wireless database management, and relates more specifically to improvements that enhance the performance and efficiency of a wireless database management system (WDMS).

BACKGROUND OF THE INVENTION

Maintaining up-to-date information in stable databases is of the utmost importance to many different companies. Banks, brokerage firms, airlines, and auction houses are examples of companies that depend on databases to produce accurate information without fail. Downtime for a database owned by one of these companies translates directly into lost revenue.

Accordingly, many companies have adopted elaborate and expensive procedures for maintaining their databases. Database maintenance almost always requires the hiring of a team of trained database administrators to perform intelligent monitoring and management of the database facilities owned by their employer. For the kinds of companies mentioned above, an experienced team of database administrators is absolutely necessary.

Traditionally, database monitoring and management has been confined to hard-wired environments where database administrators must be physically present and available at all times to perform routine maintenance and fix problems. Keeping a team of database administrators working twenty-four hours a day, everyday, simply to fix a problem that might occur is too costly for smaller companies and inefficient for all companies. If it were possible for a database administrator to monitor and manage his or her company's databases remotely, for example, from home or while on vacation, the costs of maintaining the databases might be considerably reduced. A need, therefore, exists for an efficient system and method for monitoring and managing databases remotely.

SUMMARY OF THE INVENTION

The present invention provides a system and a method for efficiently monitoring and managing databases remotely with a wireless device such as a personal digital assistant (PDA), cell phone, pager, or other similar device. Data transfer between such a wireless device and a database may require hundreds of computers. According to one embodiment of the present invention, this system of computers, the WDMS, is comprised of a wireless device, wireless base station, wireless proxy server, a plurality of routers and servers that make up the Internet, a web or application server, database server, and one or more databases.

Although the WDMS is a valuable aid to database administrators because it allows them to monitor and manage their databases remotely, it is also a challenge for would-be designers. Wireless devices transmit and receive data by electromagnetic radiation, usually of radio frequency although other frequencies can be used. Less conventional methods of wireless data transfer such as thermal, acoustic, or seismic waves might also be used. Wireless communication is usually narrower in bandwidth than either a direct or network connection; a WDMS must practice special economy in its transfer of data to and from a wireless device.

An important feature of the present invention is its storing of the results of user requests made to a database or databases from a wireless device. The results are stored on a server or servers rather than on a client, as is commonly taught in the prior art. Storing results eliminates the time needed to re-execute user requests.

According to one embodiment of the present invention, upon connection to the WDMS, a user of a wireless device is assigned session identification information. The session identification information is then associated with all stored results of that user's requests. A wireless device user sends his or her session identification information along with his or her request for a result every time a request is made; with the session identification information, a server, which in an embodiment might be a web or application server, checks to see if that result has been stored before. If not, then the necessary databases are accessed in order to produce the result, and the result is stored along with that user's session identification information. Stored results might be updated or refreshed by reaccessing the databases, even without a user's request. In addition, the rate at which stored results are updated might be adjustable.

An additional feature is provided for improving the efficiency of the WDMS by encoding the user requests made to a database or databases from a wireless device, and by storing those codes on a server, which in an embodiment might be a web or application server. With user requests encoded, the codes may be sent instead of the full text of the user requests, which in most cases are lengthy. Encoding user requests significantly reduces the amount of time that it takes to transmit requests from a wireless device to a database.

The efficiency of the WDMS is further improved by the storing of a list of addresses for a plurality of databases. The list is stored on a server, which in an embodiment is a web or application server; thus, a user of a wireless device can access a plurality of databases within the WDMS. Each address in the stored list is also associated with a nickname. In this way, user requests for a particular database or set of databases are made by reference to only their nicknames. Nicknaming databases reduces the amount of time that it takes to transmit requests from a wireless device to a database.

BRIEF DESCRIPTION OF THE DRAWINGS

The foregoing and other objects, advantages, and features of the present invention will be apparent from the following detailed description and the accompanying drawings, in which:

FIG. 4 is a set of flowcharts that illustrate the control flow of steps performed by software implemented on a wireless device and server in assigning session identification information in accordance with an embodiment of the present invention.

DETAILED DESCRIPTION OF THE INVENTION

Figure 1:
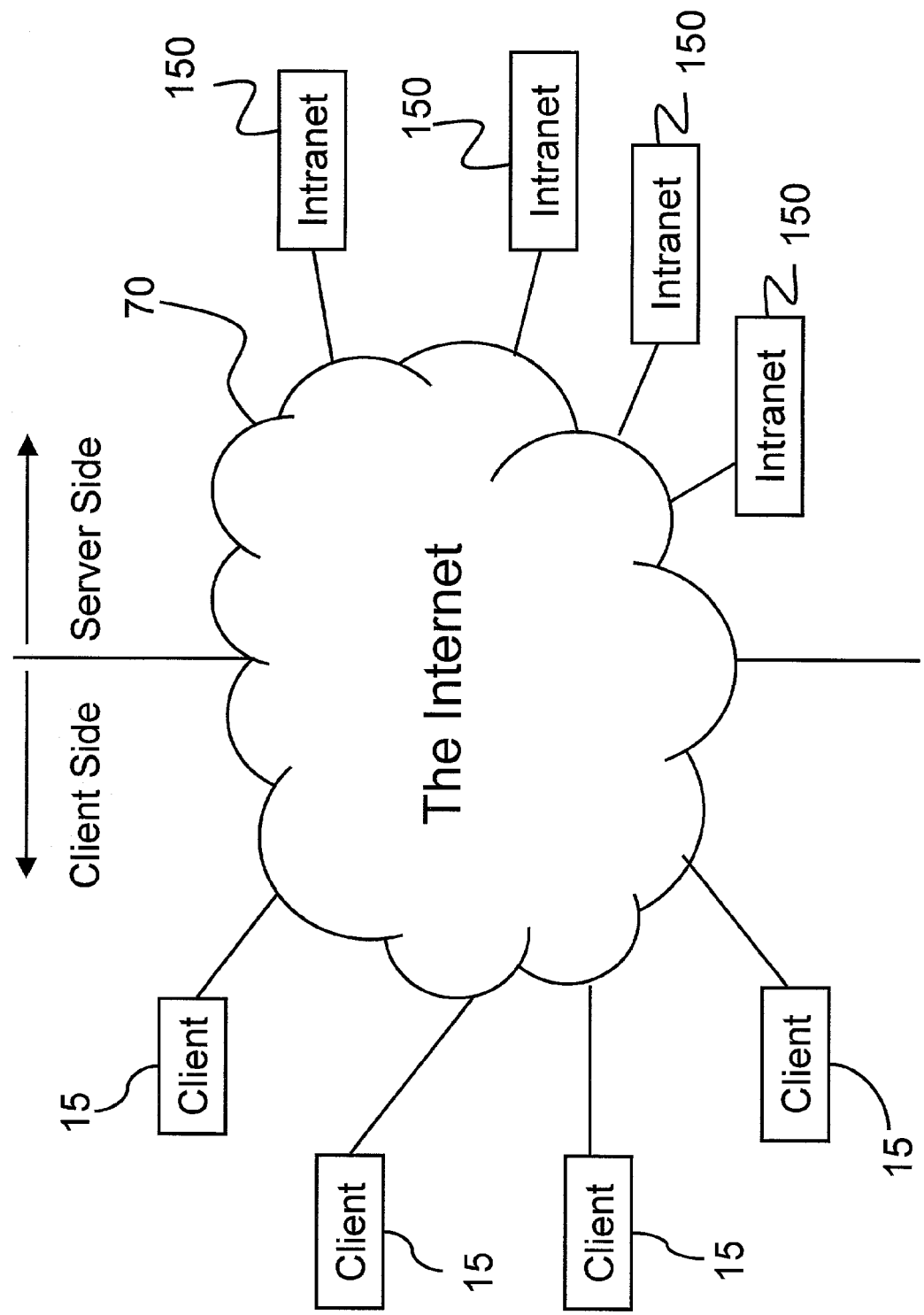
FIG. 1 is a block diagram of the overall structure of a wireless database management system in accordance with an embodiment of the present invention.

While the present invention is susceptible to various modifications and alternative forms, certain preferred embodiments are shown by way of example in the drawings and will be described in detail herein. It should be understood, however, that it is not intended to limit the invention to the particular forms described; rather, the description is intended to cover all modifications, alternatives, and equivalents falling within the spirit and scope of the invention defined by the appended claims.

Described here first is the architecture of one embodiment of the WDMS, and second, the software implemented to improve the efficiency of the system.

Referring to FIG. 1, there is illustrated a WDMS in accordance with an embodiment of the present invention. Each box or cloud in FIG. 1 represents a plurality of computers that are connected to the WDMS: on the left side of FIG. 1 are represented a plurality of clients 15, shown in greater detail in FIG. 2; on the right side of FIG. 1 are represented a plurality of Intranets 150, shown in greater detail in FIG. 3. Intervening between the plurality of clients and the plurality of Intranets is the Internet 70, which is itself comprised of a plurality of servers and routers. Information, in the form of a user request, is transmitted from the client side to the server side (i.e., from left to right in FIG. 1), and the result of such a request is received on the client side from the server side (i.e., on the left from the right in FIG. 1).

Figure 2:
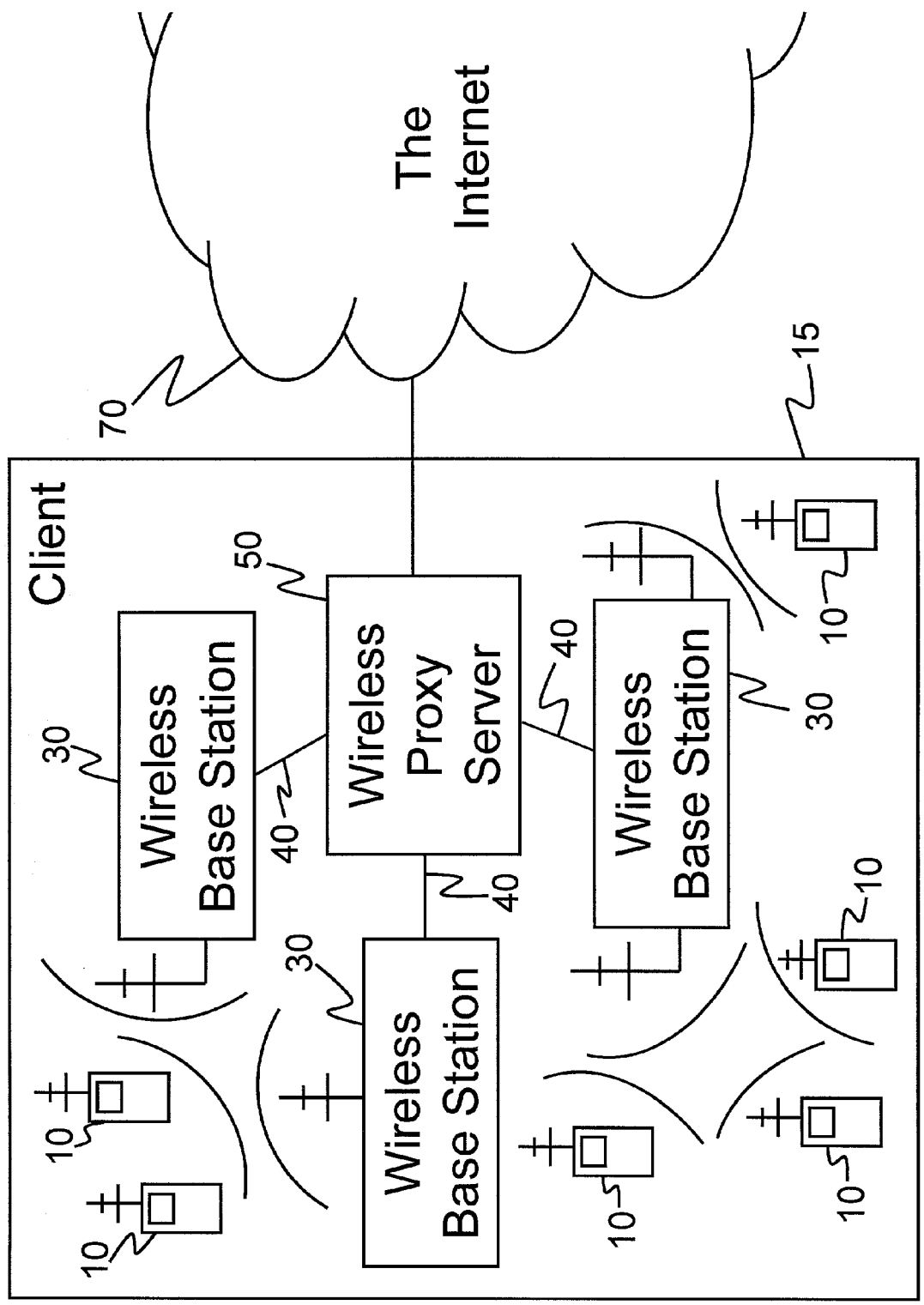
FIG. 2 is a block diagram of the typical structure of a client within a wireless database management system in accordance with an embodiment of the present invention.

FIG. 2 illustrates in greater detail a client 15. In an embodiment, the Internet 70 connects to a wireless proxy server 50 that is in turn connected to a plurality of wireless base stations 30 by a physical cable 40. Each wireless base station 30 is equipped to transmit and receive wireless communications that carry user requests and their results to and from wireless devices 10. Hence, the wireless devices 10 connected to a WDMS are one terminus for the flow of information within a WDMS, the other terminus being the plurality of databases 200 in FIG. 3 that might be connected to the WDMS.

While wireless communications are described herein by way of example as radio frequency communications, it should be understood that the invention is not limited to radio frequency electromagnetic radiation as a mode of wireless communication. Such wireless communication might use other frequencies of electromagnetic radiation such as x-ray, ultraviolet, visible, infrared or microwave. Wireless communication might also rely on other forms of transport such as statistical fluctuations in the average density of matter, as acoustic or seismic waves. Even dynamically varying thermal gradients might be harnessed as a mode for wireless communication.

The wireless base stations shown as 30 in FIG. 2 might be part of a wireless network architecture such as a MOBITEX or MOTIENT that use a digital packet-switching method, for example, the Global System for Mobile Communication (GSM), Time Division Multiple Access (TDMA), or Code-Division Multiple Access (CDMA). In another embodiment, the wireless network architecture might be circuit-switched.

Figure 3:
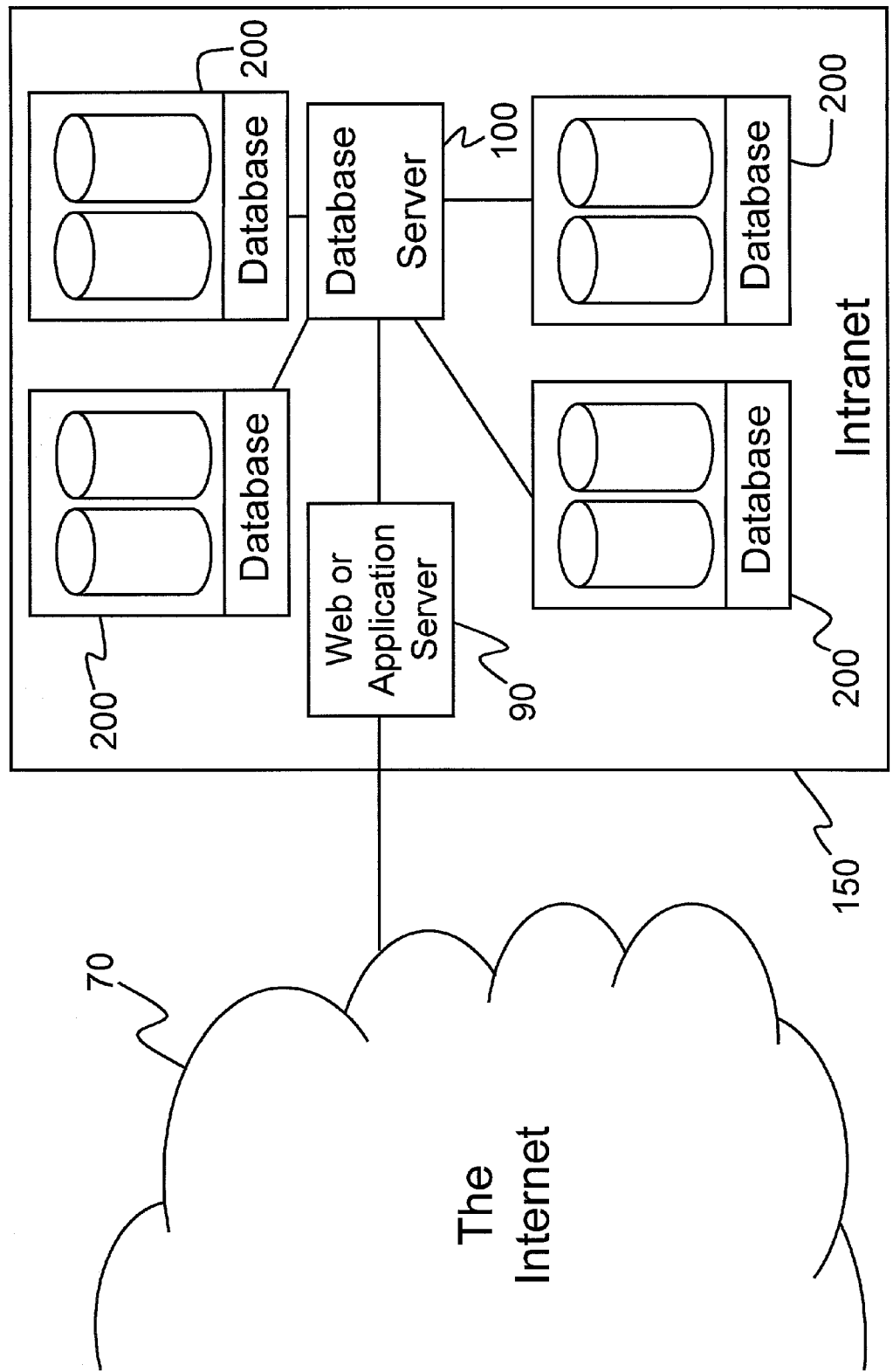
FIG. 3 is a block diagram of the typical structure of an Intranet within a wireless database management system in accordance with an embodiment of the present invention.

In FIG. 3 is illustrated what might comprise, in an embodiment of the WDMS, an Intranet 150. Typically, an Intranet is owned by a company and run by employees, including database administrators; it is usually confined to the physical environment defined by the buildings that house and the cables that connect one or more databases 200 to one or more database servers 100.

One important advantage offered by a WDMS is its novel addition of a web or application server 90 to this Intranet 150. The web or application server 90 allows the Intranet 150 to be connected to the Internet 70, and hence to wireless devices 10 as shown in FIG. 2. Thus, database administrators may perform monitoring and management tasks that previously could only have been performed at the console for a database server 100; they are freed from the physical confines of their company's Intranet; cost-savings in hiring and overtime result for their company.

With the foregoing advantages, a WDMS is obviously desirable; but there are certain challenges that face its designer. Wireless devices sometimes provide choppy and slow connections, and a user of a WDMS may not tolerate these frustrations. Accordingly, in several embodiments the present invention alleviates or removes the undesirable effects of wireless communication.

In general, an accurately kept record of the number and nature of connections made to the WDMS will aid in quickening the response and maintaining the stability of the system. FIG. 4A illustrates an embodiment of how session identification information (hereinafter "session ID") is assigned to a user of a wireless device. According to one embodiment of the present invention, a user of a wireless device 10 sends a request for connection 300 to a web or application server 90. The web or application server 90 replies by assigning session ID 310 that is unique to each user.

As mentioned above, there may be interruptions in service for a user of a wireless device 10 in FIG. 2; the use of other applications or an interruption in the broadcast signal from wireless base stations 30 might cause a connection between a wireless device 10 and a database 200 in FIG. 3 to be terminated. Given the likelihood of these events, there should be a way for users to reconnect to interrupted or terminated sessions. In an embodiment, such reconnection might not be allowed after an excessively long interval of weeks, months, or years, whereupon such old session information might be collected and deleted. This interval might be determined by a user of the WDMS, although not necessarily by a user of a wireless device 10.

According to an embodiment of the present invention, in FIG. 4B is illustrated how a lapsed session might be reconnected within an interval of time after a session has been terminated. A user of a wireless device 10 sends a request for reconnection that includes his or her previous session ID 320. A web or application server 90 responds by reconnecting the user of the wireless device to his or her previous session, identified by his or her previous session ID 330. In another embodiment, the user might be offered a choice between starting an old or a new session upon reconnection. Hours of work might be saved by a user of the WDMS by allowing session information to be retrieved in this manner.

Once stored on a server, session IDs for a plurality of wireless devices 10 connected to the WDMS through one or more web or application servers 90 might be used, either by a user at the console (keyboard and monitor connected directly to a computer) of a server within the Intranet or by a user of a different wireless device 10, to keep track of who is connected to the WDMS and what they are doing. Other administrative monitoring and management tasks, such as the update of user profiles, the setting of limits to access, and the killing of particular connections, might also be performed by a user of the WDMS (either at a console or on a wireless device 10) with software implemented on the web or application server 90.

Figure 5:
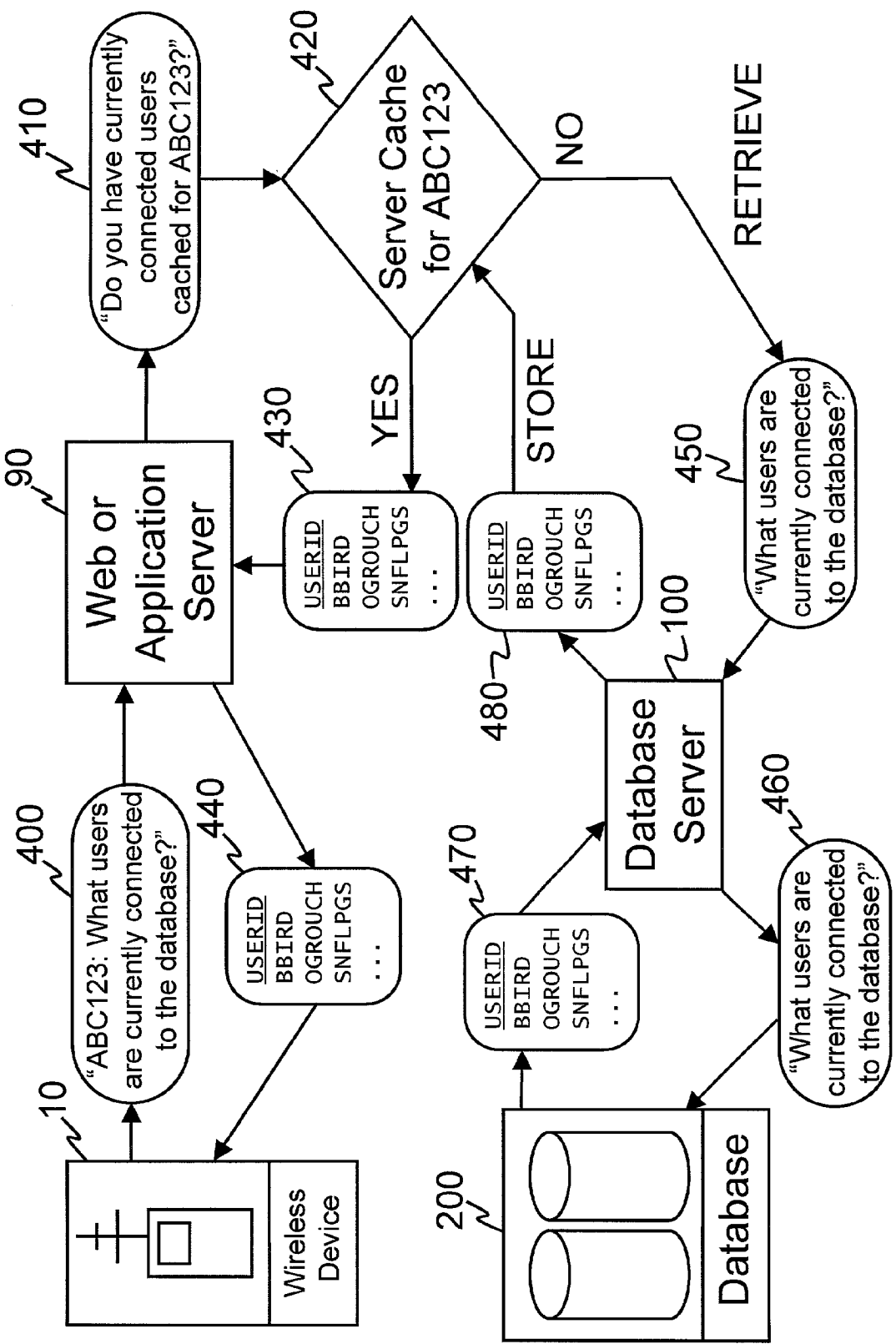
FIG. 5 is a flowchart that illustrates the control flow of steps performed by software implemented on a wireless device and server in associating session identification information with a stored result in accordance with an embodiment of the present invention.

There are other important advantages to storing session information on a web or application server 90. Session information might also be used to significantly reduce the amount of time required by the WDMS for accessing a result of a user request. When bandwidth is narrow, as it usually is for wireless communications, it is extremely important to make transmissions concise and efficient. According to one embodiment of the present invention, a session ID can be associated with a stored result of a previous request made by a user. FIG. 5 is a flowchart that illustrates how this is done in an embodiment of the present invention. A user of a wireless device 10 that has already been assigned a session ID (see FIG. 4) makes a request 400 for a result from a database 200. The request makes its way through the WDMS to a web or application server 90 that, in an embodiment, has a capacity for storing in memory results of user requests. This memory (hereinafter "server cache") is associated with a single session ID. In FIG. 5, the web or application server cache for session ID "ABC123" is labeled 420.

Once the request for a result has reached the web or application server 90, the web or application server will determine 410 whether or not there is a stored memory (in the form of a server cache associated with the session ID appended to the user's request 420) of the result of that request. If the result is stored, then it is returned directly 430 to the web or application server and sent on 440 to the wireless device 10. No database 200 is accessed if, as here, the result is stored in cache.

If the result is not stored in cache, then it is retrieved by sending the request 450 to a database server 100 that in turn accesses 460 the database or databases 200 on which the results are kept. The database or databases 200 then return the result 470 to the database server 100, which passes the result 480 to a server cache 420, where it is stored for future access, passed on 430 to the web or application server 90, and through 440 to the wireless device 10. These steps eliminate time spent accessing a database for results that have been retrieved already in a particular session—a significant savings of time when the database is large and when there are repeated or popular requests.

In most cases, the results of a request will change with time. For this reason, it is desirable for the WDMS to have a capacity for updating or refreshing stored results of user requests. In an embodiment of the present invention, an update is made by sending a request from a web or application server 90 to a database 200 and by storing the result of that request in the server cache associated with a particular session ID 420. It is important to note that, for an update, requests might not be made directly by a user of a wireless device 10; they might originate as requests scheduled by software on a web or application server 90.

In an embodiment, updates are made at an adjustable rate. For data that changes constantly, such as stock quotes or auction bids, stored results are updated every time a user requests those results; data that changes less regularly is updated only at the user's request that it be updated; data that does not change during a typical session may not be updated at all. Other rates, both faster and slower, are also possible. According to one embodiment of the present invention, the rate of update is preset for different types of user requests by configuration software implemented on a web or application server 90.

In another embodiment of the present invention, user requests made to a database or databases 200 in FIG. 3 from a wireless device 10 in FIG. 1 are assigned codes (hereinafter "encoded"), which are in turn stored in a server cache 420 in FIG. 5 associated with a particular session ID. By encoding user requests, data sent from a wireless device to a web or application server 90 is limited to a user request code and any necessary parameters that must accompany that particular request. Table 1 shows one example of how this step reduces the amount of data sent as a request.

TABLE 1

Encoding user requests

| CONVENTIONAL | EFFICIENT WDMS |
|---|---|
| "SELECT TABLE_NAME, INTIAL_EXTENT, NEXT_EXTENT, PCT_INCREASE, PCTUSED, PCTFREE, TABLESPACE_NAME, EXTENTS FROM DBA_TABLES WHERE OWNER=ERNIE" | "15ERNIE" |

On the left side of Table 1 is a full-text user request; on the right side of the table is one example of how the full-text request might be encoded. User requests are typically of the length shown in Table 1, and often contain, as this one does, hundreds of bytes of data. The number "15" is an example of a coded user request. In this case the code is numeric (base ten), but in other embodiments it might be alphanumeric (hexadecimal or base 16), or binary (base 2); any consistent system of code might be used. "ERNIE" is the value of the parameter that this coded user request requires in order for it to be processed. If the number "15" is transmitted in binary format, and if it is assumed that the numbers "0" through "15" are assigned the binary sequence "0000" through "1111", then it is possible for the entire conventional user request (hundreds of bytes in length) to be transmitted as a single byte. Obviously, this is a substantial improvement in the efficiency of the WDMS.

As shown in FIG. 3, the WDMS provides for a user of a wireless device to connect to a plurality of database servers 100 and databases 200. FIG. 3 does not show more than one database server, but in another embodiment one or more databases 200 might be connected to a web or application server 90 by a different, separate database server. Similarly, one or more web or application servers 90 might be included in an embodiment of the present invention.

The addresses, which might be, for example, the IP addresses of each database server 100 (and hence the addresses of the database or databases 200 connected to that server), are stored on a web or application server 90. Effectively, this allows a user of a single wireless device 10 within the WDMS to access a plurality of databases 200 by referring to the stored list of database server 100 addresses.

In yet another embodiment, each database server's address might be given a different nickname that is stored along with it in the list of addresses on the web or application server. These nicknames are set by a user of the WDMS. For example, "MYBANK" can reference database "BANK" at IP address "207.208.77.99". It is easier, and hence more efficient, for a user of the WDMS to work with a list of database nicknames than with a list of database addresses in the same way that it is easier to refer to a person by his or her name than by his or her address, telephone, or social security number.

Furthermore, a user of a wireless device 10 may manually switch the database 200 that is being accessed in order to process his or her request by simply selecting a different database from the list of nicknames stored on a web or application server 90. In an embodiment, a user is able to access the databases connected to the WDMS one at a time, simultaneously, or by looping through the list of databases stored on the web or application server. Table 2 shows an example of how the database or databases connected to the WDMS might be accessed in an embodiment of the present invention. This step provides an improvement in the efficiency of the WDMS in that it enables a user to execute a command on any or all of the databases connected to the WDMS with one request. Alternatively, the user would be forced to re-execute the command once for every database connected to the WDMS— an arduous and stultifying task.

TABLE 2

| User requests to databases | | |
|---|---|---|
| ONE AT A TIME | SIMULTANEOUSLY | LOOPING THROUGH |
| "Here are all the users on your current database: USERID BBIRD" | "Here are all the users on all of your databases: USERID BBIRD OGROUCH SNFLPGS" | "Here are all the users on database1: USERID BBIRD Here are all the users on database2: USERID OGROUCH Here are all the users on database3: USERID SNFLPGS" |

The WDMS also allows for one or more databases to send alerts to a wireless device. A user of the WDMS sets the requirements for an alert to be sent. For example, a user might request that an alert be sent when any database within the WDMS has less than 10% of its storage space free. Alerts present a tremendous advantage over the prior art in that they allow a user of the WDMS to be doing other things, for example, eating, sleeping, or working on a different task, besides monitoring databases; this saves money for a company that hires database administrators as it reduces the number of shifts and overtime necessary for maintaining a system.

It should be understood that various changes and modifications to the presently preferred embodiments described herein would be apparent to those skilled in the art. Such changes and modifications may be made without departing from the spirit and scope of the present invention and without diminishing its attendant advantages.

What is claimed is:

1. A method for wireless monitoring and management of a database management system (DBMS) wherein a result of a first request to the DBMS is stored for faster access when an interrupted or terminated database session is reestablished, comprising:
  receiving the first request to the DBMS, wherein the first request to the DBMS comprises at least one of a second request for monitoring a database of the DBMS or a third request for managing the database of the DBMS; and
  wherein the first request is made to the DBMS from the wireless device and is assigned a communication session identification that identifies and distinguishes a respective communication session between the wireless device and a computer system which hosts the DBMS or connects to the DBMS from any other communication session between the same wireless device and the computer system;
  checking whether the result for the first request has been stored; and
  if the result for the first request has not been stored, producing the result and storing the result on a server.

2. The method of claim 1 further comprising:
  updating the stored result of a stored first request.

3. The method of claim 2 further comprising:
  adjusting how often the stored result of the stored first request is updated.

4. The method of claim 3, further comprising:
  adjusting how often the stored result of the stored first request is updated based on a type of the stored first request.

5. The method of claim 1, wherein:
  each communication session identification further distinguishes a respective communication session between the wireless device and the computer system from another communication session between another wireless device and another computer system.

6. The method of claim 5, wherein:
  each communication session identification further distinguishes a respective communication session between the wireless device and the computer system from any other communication session between any other of a plurality of wireless devices and any other computer system.

7. The method of claim 1, further comprising:
  receiving from the wireless device a request to reconnect the wireless device to the computer system which hosts the DBMS or connects to the DBMS;
  reconnecting the wireless device to the computer system; and
  reestablishing a previous communication session between the wireless device and the computer system based on the communication session identification that identifies and distinguishes the previous communication session.

8. The method of claim 7, further comprising retrieving a session information of the respective previous communication session, wherein the session information comprises at least one of the first request to the DBMS and the stored result of the first request to the DBMS.

9. The method of claim 7, wherein reestablishing the previous communication session between the wireless device and the computer system comprises at least one of reestablishing an interrupted communication session and reestablishing a terminated communication session.

10. A method for wireless monitoring and management of a database management system (DBMS), wherein results of requests to the DBMS are stored for faster access when an interrupted or terminated database session is reestablished, comprising:
  identifying a plurality of distinct communication sessions between the wireless device and a computer system which hosts the DBMS or connects to the DBMS;
  assigning respective session identification information to each respective communication session between the wireless device and the computer system which hosts the DBMS or connects to the DBMS;
  receiving at the computer system which hosts the DBMS or connects to the DBMS in at least one of said communication sessions a first request to the DBMS from the wireless device, wherein the first request comprises at least one of a second request for monitoring a database of the DBMS or a third request for managing the database of the DBMS;
  appending the respective session identification information to the first request; and
  storing on a server the first request with the appended session identification information.

11. The method of claim 10 further comprising:
associating the session identification information with a stored result of the first request made to the DBMS, said stored result with the appended session identification information being stored on the server.

12. The method of claim 11 further comprising:
updating the stored result of the stored first request.

13. The method of claim 12 further comprising:
adjusting how often the stored result of the stored first request is updated.

14. The method of claim 13, further comprising:
adjusting how often the stored result of the stored first request is updated based on a type of the stored first request.

15. The method of claim 10, wherein:
the identifying step further identifies a plurality of distinct communication sessions between a plurality of wireless device and a plurality of computer systems; and
the assigning step assigns respective session identification information to each respective communication session between each of the wireless devices and the computer systems.

16. The method of claim 10, further comprising:
detecting a loss of connection between the wireless device and the computer system which hosts the DBMS or connects to the DBMS;
reconnecting the wireless device to the computer system; and
reestablishing a previous communications session of the plurality of distinct communications sessions between the wireless device and the computer system based on the session identification information assigned to the previous communication session.

17. The method of claim 16, further comprising retrieving a session information of the reestablished previous communications session, wherein the retrieved session information comprises at least one of:
the first request to the DBMS with appended session identification information and a stored result of the first request to the DBMS with an appended session identification information.

18. The method of claim 16, wherein reestablishing the previous communication session between the wireless device and the computer system comprises at least one of reestablishing an interrupted communication session and reestablishing a terminated communication session.

19. A method for wireless monitoring and management of a database management system (DBMS) wherein results are stored for faster access when an interrupted or terminated database session is reestablished, comprising:
assigning a code to a first request made to a computer system from a wireless device, said computer system hosting the DBMS or connecting to the DBMS, and said code being stored on a server and representing at least one command comprising the first request for instructing the server to perform certain tasks to interact with the DBMS, wherein the first request comprises at least one of a second request for monitoring a database of the DBMS or a third request for managing the database of the DBMS;
wherein in response to the interaction with the server the DBMS monitors or manages the database; and
wherein the data size of the code is less than the data size of the at least one command comprising the first request, to enable the wireless device to instruct the server to perform said certain tasks by sending the code as the request to the server instead of sending the at least one command comprising the first request to the server.

20. The method of claim 19 further comprising:
assigning session identification information to each connection established between the wireless device and the computer system which hosts the DBMS or connects to the DBMS;
associating session identification information with a stored result of a stored first request made to the DBMS from the wireless device, said result being stored on a server; and
associating the session identification information with the code assigned to the stored first request.

21. The method of claim 20 further comprising:
updating the stored result of the stored first request.

22. The method of claim 21 further comprising:
adjusting how often the stored result of the stored first request is updated.

23. A method for wireless monitoring and management of one or more database management systems (DBMSs) wherein a result is stored for faster access when an interrupted or terminated database session is reestablished, comprising:
storing addresses of a plurality of computer system servers on a separate server;
storing addresses of a plurality of DBMSs on the separate server, wherein the computer system servers host the DBMSs or the computer system servers are connected to the DBMSs;
allowing a single wireless device to interact with the plurality of computer system servers and the plurality of DBMSs by communicating to the separate server a first request for interaction with the plurality of computer system servers and the plurality of DBMSs corresponding to the stored addresses identified in the request, and wherein in response to the interaction with the separate server the DBMSs will monitor or manage one or more databases; and
assigning a code to a first request made to a database management system (DBMS) from the single wireless device, said code being stored on a server and representing at least one command comprising the first request for instructing the server to perform certain tasks to interact with the DBMS, wherein:
the data size of the code is less than the data size of the at least one command comprising the first request, to enable the single wireless device to instruct the server to perform said certain tasks by sending the code as the first request to the server instead of sending the at least one command comprising the first request to the server; and
the first request comprises at least one of a second request for monitoring a database of the DBMS or a third request for managing a database of the DBMS.

24. The method of claim 23 further comprising:
associating the respective addresses of each of the computer system servers and each of the DBMSs with respective user defined representation that are stored on the separate server.

25. The method of claim 24 further comprising:
allowing the user defined representations associated with each of the computer server systems and each of the DBMSs to be set by the user.

* * * * *